United States Patent
Nordbruch

(10) Patent No.: US 9,227,553 B2
(45) Date of Patent: Jan. 5, 2016

(54) DEVICE AND METHOD FOR ADJUSTING THE LIGHTING OF A VEHICLE IN BLIND CURVES

(75) Inventor: Stefan Nordbruch, Kornwestheim (DE)

(73) Assignee: ROBERT BOSCH GMBH, Stuttgary (DE)

( * ) Notice: Subject to any disclaimer, the term of this patent is extended or adjusted under 35 U.S.C. 154(b) by 339 days.

(21) Appl. No.: 13/822,954

(22) PCT Filed: Aug. 30, 2011

(86) PCT No.: PCT/EP2011/064886
§ 371 (c)(1),
(2), (4) Date: May 17, 2013

(87) PCT Pub. No.: WO2012/034848
PCT Pub. Date: Mar. 22, 2012

(65) Prior Publication Data
US 2013/0257273 A1    Oct. 3, 2013

(30) Foreign Application Priority Data

Sep. 13, 2010   (DE) .......................... 10 2010 040 650

(51) Int. Cl.
| B60Q 1/00 | (2006.01) |
| F21V 21/28 | (2006.01) |
| F21V 21/29 | (2006.01) |
| B60Q 1/04 | (2006.01) |
| B60Q 1/08 | (2006.01) |
| B60Q 1/14 | (2006.01) |

(52) U.S. Cl.
CPC *B60Q 1/04* (2013.01); *B60Q 1/085* (2013.01); *B60Q 1/143* (2013.01); *B60Q 2300/112* (2013.01); *B60Q 2300/23* (2013.01); *B60Q 2300/322* (2013.01); *B60Q 2300/42* (2013.01)

(58) Field of Classification Search
USPC .................................................. 362/464–467
See application file for complete search history.

(56) References Cited

U.S. PATENT DOCUMENTS

| 6,049,749 | A | 4/2000 | Kobayashi |
| 6,309,094 | B1 * | 10/2001 | Woerner ........................ 362/539 |
| 6,709,141 | B1 | 3/2004 | Sisti |
| 7,104,664 | B2 * | 9/2006 | Sugimoto et al. ................ 362/37 |
| 7,195,378 | B2 * | 3/2007 | Fukawa et al. ................. 362/465 |
| 7,611,266 | B2 * | 11/2009 | Ibrahim et al. ................. 362/464 |
| 8,552,648 | B2 * | 10/2013 | Hayakawa ....................... 315/82 |

(Continued)

FOREIGN PATENT DOCUMENTS

| CN | 101531161 A | 9/2009 |
| DE | 103 00 771 | 5/2004 |

(Continued)

*Primary Examiner* — Adam Houston
(74) *Attorney, Agent, or Firm* — Kenyon & Kenyon LLP

(57) ABSTRACT

Method and device for adjusting lighting for a vehicle in consideration of the visibility of a curve, light having a glare effect (high beam light) being deactivated before negotiating a curve, if the curve is not visible, or optionally the illumination being increased if the curve is visible. Adjusting the lighting, in particular of headlights, for a vehicle having a first step, in which an upcoming curve is recognized, its visibility is ascertained, the visibility representing the possibility of glare, in particular to other road users, in particular to oncoming traffic, and a second step, of adjusting the lighting between the least possible glare and the best possible illumination, characterized in that the adjustment is carried out as a function of the visibility.

12 Claims, 2 Drawing Sheets

(56) References Cited

U.S. PATENT DOCUMENTS

| | | | |
|---|---|---|---|
| 8,648,535 B2* | 2/2014 | Tatara | 315/81 |
| 8,874,312 B2* | 10/2014 | Park et al. | 701/36 |
| 8,888,340 B2* | 11/2014 | Lee | 362/466 |
| 2002/0036901 A1* | 3/2002 | Horii et al. | 362/37 |
| 2002/0080617 A1* | 6/2002 | Niwa et al. | 362/465 |
| 2004/0114379 A1* | 6/2004 | Miller et al. | 362/464 |
| 2004/0143380 A1* | 7/2004 | Stam et al. | 701/36 |
| 2007/0147055 A1* | 6/2007 | Komatsu | 362/464 |
| 2007/0253210 A1* | 11/2007 | Hasegawa | 362/464 |
| 2008/0084286 A1* | 4/2008 | Teramura et al. | 340/438 |
| 2009/0279316 A1* | 11/2009 | Hikmet et al. | 362/465 |
| 2009/0279317 A1* | 11/2009 | Tatara | 362/465 |
| 2009/0323366 A1* | 12/2009 | Furusawa | 362/466 |
| 2010/0033978 A1* | 2/2010 | Ehm | 362/465 |
| 2011/0012511 A1* | 1/2011 | Watanabe | 315/82 |
| 2011/0075435 A1* | 3/2011 | Robert et al. | 362/466 |
| 2012/0044708 A1* | 2/2012 | Schmidt et al. | 362/466 |
| 2012/0134164 A1* | 5/2012 | Park et al. | 362/464 |
| 2012/0203428 A1* | 8/2012 | Choi et al. | 701/37 |
| 2012/0203432 A1* | 8/2012 | Lukacs et al. | 701/42 |
| 2012/0275172 A1* | 11/2012 | Mizuno | 362/464 |
| 2012/0309421 A1* | 12/2012 | Nabbefeld | 455/456.1 |
| 2013/0051042 A1* | 2/2013 | Nordbruch | 362/466 |
| 2013/0128599 A1* | 5/2013 | Park et al. | 362/466 |
| 2013/0235600 A1* | 9/2013 | Fogg et al. | 362/464 |
| 2013/0258688 A1* | 10/2013 | Kalapodas | 362/465 |
| 2014/0071702 A1* | 3/2014 | Faber et al. | 362/466 |
| 2014/0268837 A1* | 9/2014 | Simchak et al. | 362/465 |
| 2015/0003087 A1* | 1/2015 | Futamura et al. | 362/466 |
| 2015/0016128 A1* | 1/2015 | Doerne et al. | 362/465 |
| 2015/0153183 A1* | 6/2015 | Kadous et al. | 701/532 |
| 2015/0153187 A1* | 6/2015 | Dong et al. | 701/446 |

FOREIGN PATENT DOCUMENTS

| | | |
|---|---|---|
| DE | 10 2005 036 948 | 7/2006 |
| DE | 10 2005 038 581 | 3/2007 |
| DE | 10 2008 041679 | 3/2010 |
| EP | 0864462 A1 | 9/1998 |
| EP | 1 115 010 | 7/2001 |
| EP | 1 591 754 | 11/2005 |
| EP | 1 914 115 | 4/2008 |
| EP | 2 085 280 | 8/2009 |
| EP | 2 100 769 | 9/2009 |
| JP | 2000198385 A | 7/2000 |
| JP | 2004 098819 | 4/2004 |
| JP | 2007112280 A | 5/2007 |
| JP | 2009195335 A | 9/2009 |
| WO | 2006/111291 | 10/2006 |

* cited by examiner

DEVICE AND METHOD FOR ADJUSTING THE LIGHTING OF A VEHICLE IN BLIND CURVES

FIELD OF THE INVENTION

The present invention is directed to a device or method for adjusting the lighting of a vehicle in blind curves according to the definition of the species in the independent claims.

BACKGROUND INFORMATION

A light control system is discussed in JP 2004098819 A, which recognizes road conditions and, in the case of a curving road, checks whether the head lights are switched to high beam light, in order to adjust them to low beam light in this case.

A system for light control and glare monitoring is known from US 2002080617 A, the lighting being adapted as a function of the area in which the vehicle is located and as a function of the road course. The lighting is adjusted as a function of the probability with which the vehicle is located in a specific area or before a specific road course.

The generally known problems of vehicle lighting are that, on the one hand, the driver of the vehicle wishes to achieve the best possible illumination for reasons of comfort and safety, while on the other hand, however, not cause glare for other road users. Systems for automatic light control are known, which recognize headlights of an oncoming vehicle. Such a recognition fails, however, if a curve is to be expected or is located in the upcoming road course and an oncoming vehicle appears suddenly, so that the glaring light (e.g., high beam light) may not be adapted or deactivated rapidly enough.

The teaching of the first-mentioned publication attempts to solve the problem in that the high beam light is deactivated in general before each curve, independently of whether or not a vehicle is oncoming.

SUMMARY OF THE INVENTION

The device and the method according to the present invention having the features described herein have the advantage over the related art in that an adaptation of the adjustment of the lighting does not occur globally upon the presence of an upcoming curve, but rather is carried out in practice as a function of the visibility of the curve or into the curve and therefore the traffic situation may be dealt with more specifically. In particular, a driver or also an automatic system for glare avoidance of oncoming vehicles in the curve may not react sufficiently rapidly to adjust the lighting to avoid glare if, e.g., a vehicle in a blind curve suddenly comes "around the corner." A preventive adjustment is therefore only meaningful in this situation, while in situations in which the curve is visible, such an adjustment would not be meaningful.

Furthermore, it may be advantageous that the other road users do not have to be recognized visually (e.g., with the aid of a costly camera) or via other sensors, and therefore a simplified cost-effective system may be demonstrated, which possibly does not include the complete functionality of an automatic high beam controller, but assists the driver in specific, rather difficult situations (as here: inability to see into the curve).

The following steps must be executed to carry out the method: An upcoming curve must be recognized and furthermore its visibility must be established.

If a curve is coming up, the extent of the visibility determines whether an adjustment of the lighting is carried out and to what extent.

Advantageous refinements and improvements of the method specified in the independent claim are possible through the measures listed in the dependent claims.

An adjustment/adaptation of the possibly glaring illumination is advantageously only to be carried out if it actually may not be judged before a curve whether a vehicle is oncoming, which is the case if the curve is not visible. On the other hand, if the curve is visible and a possibly oncoming road user may be recognized in a timely manner using existing systems, no measure must be carried out within the scope of glare avoidance. Rather, in this case the illumination may optionally (automatically) be increased, if necessary without activation by the driver, in order to assist him when negotiating the curve. The risk of greater glare probability with better illumination may be accepted, since the curve is considered to be visible and the driver, like an automatic system, may be able to reduce or avoid the possible glare in a timely manner by adjusting the lighting.

The adjustment may be carried out in this case by continuous change of lighting parameters (e.g., luminosity, light direction, light angle) or in (at least two) steps (e.g., high beam light—low beam light).

Data which provide information about the visibility of a curve may advantageously be transmitted. In particular, data may be requested from a database on upcoming route sections (here: curves), for example, from a database of a navigation system, whose fundamental maps provide curve information. In addition to the data from a database (e.g., of the onboard navigation system), alternatively or additionally, further databases, for example, those kept ready online (e.g., Internet) may be used, which provide additional data (e.g., on the building development or landscape), in addition to the curve information. Some modern navigation devices already provide the option of accessing external databases (e.g., from the Internet).

A vehicle-bound or onboard system is also suitable as a further conceivable data source, which has obtained data on the basis of previous travels past the same point through the same upcoming curve, which may now be used. Such a method is discussed in DE 10 2008 041679 A1, which is incorporated here by reference. A video camera is used therein, which registers the space lying ahead, through which one's own vehicle will move. The video-based system recognizes objects, e.g., buildings, and therefore knows of their existence. A visibility of a curve may be derived, since the lines of sight could have been determined by the recording during the earlier passage. Through an onboard system, independence may be achieved from external databases, which may possibly be incorrect or incomplete. A data fusion may also occur, of course, and the data from the databases and the onboard systems may be linked to one another.

Data from the database or from the onboard system may also alternately be resorted to depending on the position, e.g., the data of the video camera may be used when it delivers analyzable data or registers an area which is considered to be sufficiently visible. If this is not the case, the system may switch over to other data sources. Data fusion and a plausibility check may also alternatively take place.

The data may advantageously include images from satellite images, aerial images, or road images, from which the visibility of the curve may be derived with the aid of image analysis methods. For example, a restricted visibility may be presumed if the satellite image recognizes a dense forest around the curve. Or the visibility may be determined on the basis of road images which were recorded in the curve area.

This information may be ascertained by image-analyzing/imaging methods from satellite, aerial, or road images, in which, e.g., based on the location of the curve, it is checked what is located on the inside curve, where the required line of sight is located. If corresponding vegetation, buildings, or mountains are recognized there, the (lack of) visibility may be concluded. The lines of sight may also be exactly determined if necessary based on geometrical considerations, so that, as a function thereof, the light adjustment is only used at the corresponding points where the lines of sight actually do not exist, in order to recognize an oncoming road user in a timely manner, so that the glaring light may be reduced or deactivated in a timely manner on the part of the driver or on the part of an automatic system.

A dimension of the visibility may advantageously be obtained from various data. In addition to direct specifications on the visibility of a curve, whether as a discrete value (e.g., visible yes/no) or as a continuous dimension for the visibility (e.g., the predictive range in the curve), data may also exist which provide indirect information about the visibility. Modern navigation devices or the maps on which they are based often provide additional data on building developments or landscapes, from which it may be estimated with the aid of a heuristic, for example, whether and how well visible an upcoming curve is.

This includes information about the topography, e.g., if mountains are located adjacent to the road in the inside curve, as may be the case on a mountain road, and therefore visibility does not exist or is only restricted. Information about building development may also be useful; thus, for example, the position of each house or each house number in a road is usually known and if it is located close to a curve (in particular at sharp junctions), restricted visibility may be presumed there. Information about the landscape may also be significant; thus, for example, in a wooded region (depending on the density of the forest if this information is provided), restricted visibility in curves may be presumed. Further vegetation may also be an indicator of the visibility, for example, hedges on plots of land, in particular if they grow close to the road.

The method may advantageously be restricted to only carrying out the adjustment if the vehicle travels along the inner side of a curve, i.e., on the inside lane. Depending on whether there is left-hand or right-hand traffic, the inside curve may be a left-hand curve or a right-hand curve. An oncoming road user would move completely through the light cone of one's own vehicle.

Since the light cone illuminates the inner lane of the curve less or not at all during through travel on the outer lane, in particular if adaptive curve light is not used, it is rather improbable that an oncoming vehicle would be subject to glare in this case, so that an intervening adjustment is not necessary.

Instead of completely omitting the adjustment when negotiating an outer curve, a reduced adjustment may also take place, whereby the light is only adjusted to have somewhat less glare, than in the case of complete adjustment, in which if possible no glare at all is to occur. This may represent a possible good compromise between optimum illumination and the probability of subjecting oncoming traffic to glare in consideration of the glare effect which is possible at all.

It may advantageously also be determined on the basis of other features whether a road user is oncoming. Thus, intelligent light control systems may currently only directly recognize oncoming headlights, but it is conceivable to recognize the reflections of headlight lights, as usually occur in the case of an oncoming vehicle in the curve before its appearance, with the aid of image-analyzing methods. If this takes place in a timely manner before the glare, the adjustment according to the present invention may also be omitted. Whether it is possible for the onboard systems to perceive such effects may also again be ascertained from databases, for example, which may also again provide information, for example, of whether a light cone would reflect in such a way that the onboard system could perceive it. This principle may also be carried out with the aid of other physical secondary effects which are present because of the presence of another road user as shown (its illumination).

Advantageously, when a blind curve has been recognized, it is possible to proceed with the adjustment in various ways. The presumably simplest option is to deactivate the high beam light, if activated, and to switch over to a standard light (low beam light, etc.). Furthermore, changing the light direction or influencing the light distribution is conceivable.

The light distribution may advantageously be adjusted in such a way that the lane or roadway of the possibly oncoming road user is not illuminated in such a way that glare occurs at this point. The standard illumination would be adapted in such a way that above all one's own lane is illuminated, but not the opposite lane or the location at which the road user is located. This does not have to be a road lane in this case, but rather may also relate to sidewalks or bicycle paths, on which possible road users are located. This also applies similarly for other objects to be protected from glare.

The point at which this method is used is advantageously defined. The section of a traffic route (in particular in a road) is usually composed of various (mathematically defined) segments, in addition to straight lines and circular arcs, transition arcs such as clothoids or other shapes also being used. The request for the suitable point in time (or location) for activating or deactivating the adjustment device according to the present invention may be determined on the basis of the special points of these mathematically definable segments. In particular, the apex of a curve or a curve segment which designates the point of the maximum curvature comes into consideration in this case. Furthermore, the middle of the curve, i.e., the halfway point of the distance within a curve, may also be used as the starting point, as well as node points, which are the points which connect the individual mathematically defined segments to one another, in particular, e.g., a curve beginning or end. As a function of this reference point, at a configurable distance therefrom (this may be greater than, equal to, or less than 0), the activation or, in a second point (for example, the curve end), the deactivation of the adjustment device according to the present invention may be prompted.

The configurable distance for the activation or deactivation of the adjustment device according to the present invention from the reference point may advantageously be selected adaptively or variably as a function of several parameters. For example, in the case of a greater curve radius, the configurable distance may be selected in such a way that the adjustment device is first activated closer to the curve or even in the curve, in comparison to a small curve radius. This may make sense, since a curve having a greater radius is more visible and the moment at which an oncoming road user appears is not so sudden as in the case of a curve having a small radius. The speed of one's own vehicle may also be an influencing parameter, which determines the configurable distance; thus, at high speed the point of the execution of the adjustment may be shifted close to or into the curve, since, firstly, the surroundings may have a quasistatic effect at high speed and the time period for an appearance of another road user is shorter and therefore the probability that one will appear at all is lower.

Secondly, the higher speed causes a higher safety requirement for the host vehicle, which more strongly promotes good illumination. The distance of the visual obstruction from the curve has an influence on how early the adjustment device is to be activated. If the visual obstruction is a certain distance away from the curve, the adjustment may be carried out later than if the curve is very blind. This is also true for canceling the adjustment, i.e., the establishment of the earlier lighting (e.g., of the high beam light), if it may be presumed toward the end of the curve that the visibility of the section lying further ahead is (again) ensured.

The adjustment device according to the present invention is advantageously deactivated again or its influence is canceled out or reduced when it is no longer required. This is the case in particular if the visual obstruction is no longer present, for example, if the movement of the vehicle has progressed in such a way that a line of sight to the areas of the possible oncoming traffic is again present. Alternatively, when the visual obstruction or the line of sight is not determinable, for example, the adjustment may always be globally canceled out when the end of the curve is reached or after the vehicle has driven through it. An illumination then takes place again as is optimal for the driver of one's own vehicle, or as it was previously adjusted. The illumination-reducing intervention of the adjustment device according to the present invention is therefore maintained only as long as necessary. Under certain influencing parameters, as already mentioned, the adjustment may be canceled out earlier or later than at a reference point as a function of further parameters.

The adjustment device according to the present invention, which may be implemented as (part of) a regulator/controller, is advantageously only a part of a higher-order regulator structure for the light control, which fulfills objects from the known related art, for example. In particular, the adjustment device according to the present invention is not to be activated or deactivated if higher priority reasons for another formation of the illumination are present. For example, if oncoming traffic is definitively recognized, glare should be avoided and the adjustment device according to the present invention should not be deactivated after the curve in spite of this, for example, in such a way that the high beam light is activated and the recognized oncoming traffic would be subject to glare, for example. The adjustment device according to the present invention could nonetheless be deactivated in this case intrinsically in the system, but a higher-order regulator must then intervene with higher priority in the system, however, so that high beam light is avoided.

The present invention not only relates to vehicles but rather to road users in general, in particular those who would be subject to glare by the headlights of one's own vehicle. In addition to automobiles and trucks, this may also include bicycle riders and pedestrians, and expansion to static objects is also conceivable which do not actively participate in the traffic, but where glare is nonetheless undesirable, e.g., in the case of buildings. An oncoming road user in the present case also means a possibly oncoming road user, or in particular such a possibility, since this is usually a preventive measure and the actual existence of a road user is not (yet) known. Furthermore, road users who are not oncoming, but would be subject to glare at all, are also included.

The light distribution of a headlight characteristic is understood as the way in which the light emitted by the headlight is finally distributed on the surroundings. There may be various light directions or main light directions in this case and the intensity may differ in these various directions. Thus, it is classically conceivable in the case of curve lighting that the light distribution in the direction of one's own lane is determined in such a way that more extensive illumination (i.e., into the distance), takes place than the light component which is emitted onto the opposite lane, which illuminates the proximity. This light component which is emitted onto the opposite lane, but does not extend far into the distance, may in turn be deflected further into the curve for this purpose so that the illumination angle becomes greater therein. Various illuminations are conceivable through the corresponding selection of a light distribution and light direction; the most well-known are high beam light, low beam light, city light, expressway light, and curve light.

The terms of glare or non-glare are not necessarily to be understood as discrete; the glare effect increases with increasing luminosity, however, but, vice versa, also may not be entirely avoided without turning off the light. Glare avoidance may also mean a glare reduction in the present case. Greater illumination is usually accompanied with a higher glare risk; these two factors are therefore generally concurrent. On the one hand, the best possible illumination is to be achieved; on the other hand, glare is to be avoided.

The route section which is upcoming or to be driven through is the section which is located in front of the vehicle and in all probability will be driven through. This may be recorded and recognized by an above-described video camera, for example, and by data from a navigation system. The recording could have been prepared by a camera in one's own vehicle, or also in another vehicle.

Image-related data may contain the images from an onboard camera which were recorded during the current trip, on the one hand. Furthermore, they may also include data which were recorded in an earlier trip of the same vehicle.

On the other hand, such data may originate from second sources, which were produced with the aid of a camera of a satellite (satellite image), an aircraft (aerial image), or another ground-based device (vehicle) (road image). Road images may be individual images recorded on the ground, which have a reference to the road scenery, in particular the view from the road. Furthermore, these also include panoramic images which allow virtual travel through the region with the aid of suitable data preparation. In a certain way, it is thus possible to virtually predictively look around the curve, whereby the static conditions of the scenario would become known.

Straight lines which allow a free view between two points are described as the line of sight or axis of sight. The boundary lines of sight are particularly significant for the judgment of the visibility; these are the ones which simultaneously form a tangent on a visual obstruction. A boundary line of sight may be determined, for example, in that one end is located on the area to be seen after the curve and, on the other hand, it is tangent to a visual obstruction (e.g., a building in the inside curve). The view is again unrestrictedly free on the upcoming route section where this straight line forms an intersection with the future travel trajectory of one's own vehicle. This would simultaneously be the point, for example, at which normal illumination may again be used and the adjustment device according to the present invention may be deactivated again.

The visibility of a route section (or a curve) provides a dimension of the probability of a sudden appearance of a road user and therefore a glare probability.

Furthermore, the geometrical conditions are to be taken into consideration, since good visibility may also include the area of the curve which is not (yet) illuminated at all by one's own lighting and therefore allows a timely real preventive reaction and adjustment of the lighting. The visibility may be determined if a boundary line of sight exists which includes a sufficiently large part, which is to be defined, of the curve or an area before the curve, so that expressed in terms of driving psychology: The action in the curve may be observed sufficiently far ahead that the driver or a driver assistance system may take measures (or countermeasures) in a timely manner, before another road user is subject to glare. A possible similar measure for the visibility would be the angle of the boundary line of sight in relation to the travel direction or illumination direction. A road section may be designated as visible if a specific boundary angle is exceeded and as blind if the angle falls below this angle. Alternatively, the distance which is visible beforehand may also be incorporated into the dimension of the visibility. This may possibly also depend on the speed; the predictive range must usually be greater at higher speed to be able to react in a timely manner. Since the speed of one's own and other vehicles is not always known, speed limits (value may be ascertained, e.g., from a database (navigation device)) may also be assumed as the maximum value of a possible speed to be expected.

In a similar way, predictive range designates the distance at which an area/scenery is visible. This is usually limited by physical conditions (e.g., Earth's curvature, weather conditions (fog), delimitations of the line of sight), or by technical conditions (e.g., characteristics of the camera).

Exemplary embodiments are illustrated in the drawings and explained in greater detail in the following description.

DETAILED DESCRIPTION

Figure 1A:
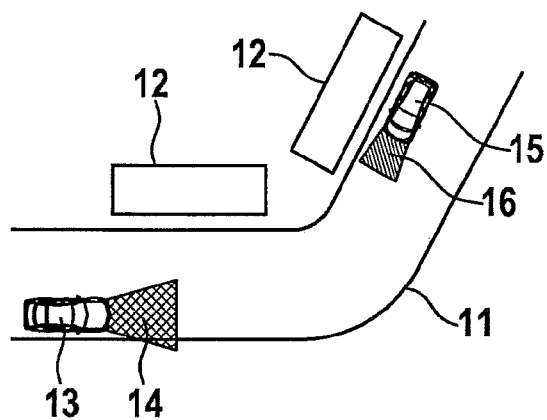
FIG. 1 shows the problem of glare of an oncoming vehicle in a curve.
Figure 1B:
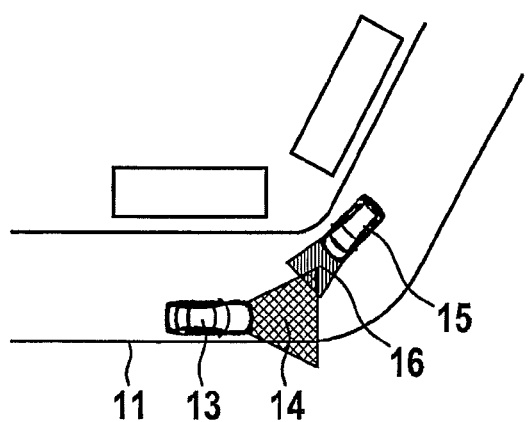

FIG. 1a shows a scenery of a road 11, in which one's own vehicle 13 is located, which emits a light cone 14 with high beam light and may not yet see, because of vision-obstructing building 12, that another vehicle 15 having a (in the illustrated case) low-beam light cone 16 is oncoming. If the vehicles move toward one another, at a later point in time, as shown in FIG. 1b, the light cone of the high beam light of one's own vehicle 14 will subject the vehicle or the driver of vehicle 15 to glare.

Figure 2:
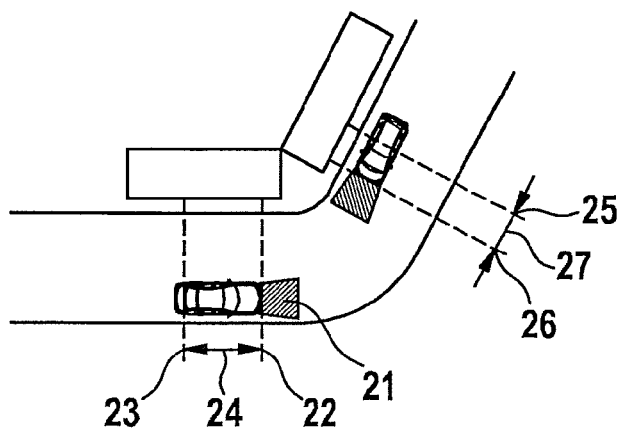
FIG. 2 shows the location points and effect of the adjustment of the lighting.

FIG. 2 describes how the method remedies the problem from FIG. 1. At a location point 23, the high beam light of one's own vehicle is already deactivated for this purpose, this point 23 being located at a configurable distance 24 before the apex or starting point of curve 22. At point 23, the high beam light is switched over to low beam light 21. The high beam light may be reactivated or the adjustment may be canceled out already before the end of curve 25 at a configurable distance 27 (which does not necessarily have to correspond to configurable distance 24) at a point 26 before the curve.

Figure 3A:
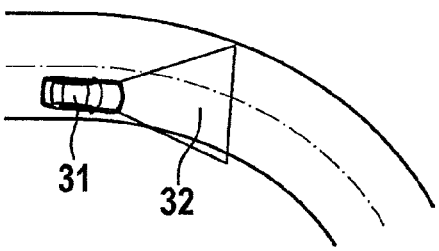
FIG. 3 shows the adaptation of the method to the illumination of one's own lane.
Figure 3B:
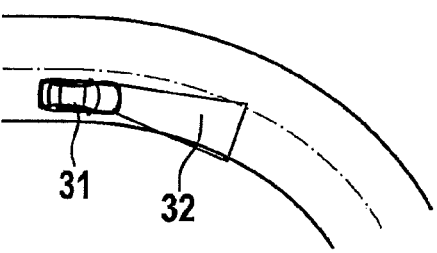
Figure 3C:
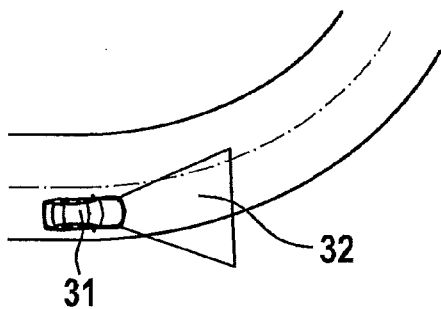
Figure 3D:
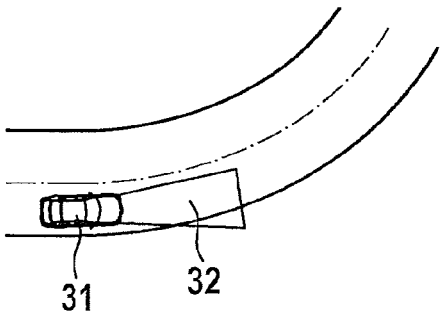

FIGS. 3a and 3b show a right-hand curve, the method not being applied in FIG. 3a and one's own vehicle 31 emitting light cone 32 not only over one's own lane 33 but rather also over the opposite lane. In FIG. 3b, the light cone is accordingly adapted in such a way that (essentially) only one's own lane is illuminated. In FIGS. 3c and 3d, the same is shown for a left-hand curve or an outside curve.

What is claimed is:

1. A method for adjusting lighting of headlights for a vehicle, the method comprising:
   recognizing an upcoming curve and ascertaining its visibility, the visibility representing the possibility of glare to oncoming traffic; and
   adjusting the lighting between the least possible glare to oncoming traffic and the best possible illumination, wherein the adjustment is carried out as a function of the visibility so that at least one of the following is satisfied: (a) in the case the possibility of glare to oncoming traffic does not exist, an illumination-increasing adjustment is carried out, and (b) in the case the possibility of glare to oncoming traffic exists, a glare-reducing adjustment is carried out;
   wherein in the recognizing task, it is recognized whether the vehicle is negotiating the outer side or the inner side of the curve, and wherein in the adjusting task, one of (i) the glare-reducing adjustment is carried out only if the vehicle travels through the inner side of the curve, or (ii) the glare-reducing adjustment is not reduced to the same extent when the vehicle travels through the outer side of the curve as would be the case during travel through the inner side of the curve.

2. A method for adjusting lighting of headlights for a vehicle, the method comprising:
   recognizing an upcoming curve and ascertaining its visibility, the visibility representing the possibility of glare to oncoming traffic; and
   adjusting the lighting between the least possible glare to oncoming traffic and the best possible illumination, wherein the adjustment is carried out as a function of the visibility;
   wherein the visibility is ascertained on the basis of data which were obtained by a vehicle-bound system in earlier travels past the same point.

3. The method of claim 2, wherein the data contain satellite, aerial, or road images or are generated therefrom.

4. The method of claim 2, wherein the visibility is obtained by interpretation of data including data concerning the topography, the building development, the landscape, the vegetation, and accidents.

5. The method of claim 1, wherein in the recognizing task it is also established whether a road user is present, on the basis of physical effects which the road user achieves without being directly visible.

6. The method of claim 1, wherein the adjustment includes one of a deactivation of the high beam light, an activation of the low beam light, a change of the light direction, and a change of the light distribution.

7. The method of claim 6, wherein the light distribution is adjusted so that the possibly appearing road user or his lane or roadway is illuminated less.

8. A method for adjusting lighting of headlights for a vehicle, the method comprising:
   recognizing an upcoming curve and ascertaining its visibility, the visibility representing the possibility of glare to oncoming traffic; and
   adjusting the lighting between the least possible glare to oncoming traffic and the best possible illumination, wherein the adjustment is carried out as a function of the ascertained visibility;
   wherein an apex or node point of the curve is determined in the recognizing task, and the adjustment is carried out in the ascertaining task in the apex or node point of the curve or at a configurable distance away from the apex or node point.

9. The method of claim 8, wherein the configurable distance is selected as a function of at least one of the curve radius, a speed of one's own vehicle, and a distance of a visual obstruction from the curve.

10. The method of claim 1, further comprising:
canceling out the influence of the adjustment at least one of when (i) the possibility of glare to oncoming traffic does not exist again and (ii) when the curve has been negotiated.

11. The method of claim 1, wherein the adjustment is part of a higher-order regulating structure for the light control.

12. A device adjusting lighting of headlights for a vehicle, comprising:
a unit for recognizing an upcoming curve to be traveled and ascertaining its visibility, the visibility representing the possibility of glare to oncoming traffic; and
an adjustment unit, which is configured so that the adjustment of the lighting takes place between the lowest possible glare to oncoming traffic and the best possible illumination, and the adjustment is carried out as a function of the visibility so that at least one of the following is satisfied: (a) in the case the possibility of glare to oncoming traffic does not exist, an illumination-increasing adjustment is carried out, and (b) in the case the possibility of glare to oncoming traffic exists, a glare-reducing adjustment is carried out;
wherein in the recognizing task, it is recognized whether the vehicle is negotiating the outer side or the inner side of the curve, and wherein in the adjusting task, one of (i) the glare-reducing adjustment is carried out only if the vehicle travels through the inner side of the curve, or (ii) the glare-reducing adjustment is not reduced to the same extent when the vehicle travels through the outer side of the curve as would be the case during travel through the inner side of the curve.

* * * * *